Inventors.
William H. Clark,
Emerson T. Cannon, &
William S. Partridge.
By Meriam, Smith, & Marshall
Attys.

United States Patent Office 3,113,272
Patented Dec. 3, 1963

3,113,272
AMPLIFYING BY SHORT-CIRCUITING
CONDUCTIVE LOOP
Emerson T. Cannon, Salt Lake City, William H. Clark, Park City, and William S. Partridge, Salt Lake City, Utah, assignors to Utah Research & Development Co., Inc., Salt Lake City, Utah, a corporation of Utah
Filed Sept. 6, 1961, Ser. No. 136,337
24 Claims. (Cl. 328—1)

This invention relates to a method and apparatus for converting mechanical or chemical energy obtainable from one or another source into electrical energy. The invention may be looked upon from a broad aspect as being in the nature of an electrical current amplifying device by means of which greatly increased currents and field intensity may be realized.

It is known that in many instances where extremely high energy effective over a very limited time period is required, substantial expense and investment are required to achieve the desired end result. Illustratively, in the MKS system, it will be recognized that a condenser bank of the type required to deliver as much as one million joules of energy within a very few microseconds (or even times reduced to the order of millimicroseconds) would represent a very substantial investment. On the other hand, the same amount of electrical energy, for instance, if recoverable, could be obtained from mechanical or chemical components of limited cost.

By the invention herein to be described, provisions are made whereby the stored energy contained within various forms of energy-bearing elements is made to be recoverable and convertable into electrical energy by using it to rapidly compress or collapse a magnetic field within which the energy released by the energy-initiating element is stored.

The invention provides an electrical current amplifier operated and controlled from a rapidly released mechanical force in such a way as to be capable of increasing the current in the circuit, the intensity of the field generated by the current flowing in the circuit, and the magnetic flux in the field. In its simplest form the amplifier device herein to be described is one wherein a small flux is established by an energy source which produces a current flow in a conductor loop. The conductor loop is then rapidly and progressively shortened mechanically thereby to concentrate the developed field into a smaller volume to deliver to a final collecting or energy directing means a highly concentrated magnetic flux. The energy is recovered in usable form by any suitable type of coupling and supplied to a load circuit or directed into a utilization device. The load at times may even be like the first amplifier and form a second stage cascaded therewith.

In accordance with Faraday's laws, it is known that any device which amplifies flux inherently possesses a somewhat complicated design because of the premise that the total flux linking a perfect conductor cannot change. In this respect the invention herein to be set forth provides for magnetic field compression in one or more stages in such a way that the contemplated device is one wherein the magnetic flux lines are twisted and multiplied, as it were, so that the energy supplied by a suitable mechanical or chemical source is caused to advance a short-circuit between appropriate conducting leads to drive the developed flux lines ahead of the progressively changing position of the short-circuit.

The device may be either single- or multi-stage. Where a multi-stage device is selected the problem which is solved by this invention is that of so controlling the passage of the magnetic flux lines as to cause them to pass successively through a selected number of paths defined by pairs of conductors. The conductors are branched and twisted and recombined in such manner as to provide $n$ pairs of conductors, where $n$ represents the number of times each conductor is branched. The twisting is accomplished in such a manner as to force each flux line in the original pair of conductors to pass through $n$ pair of conductors in the same direction. At the end of the paths the flux lines are recombined in adding relationship. By this procedure an initial path is divided into $n$ paths, which are combined and terminated in some apropriate region where the twisted flux lines add to produce $n$ flux lines for each original flux line and of which there may be any desired number of repetitions.

The apparatus as it is produced comprises electrical conductors of high conductivity which are so twisted and branched that the flux lines are forced to pass through selected working areas at least twice. This device converts cheap mechanical or chemical energy into a more usable and readily workable electrical form at an operating cost which is but a fraction of that which would normally be required to concentrate energy in a localized spot.

The device described herein has many and various uses, certain of which will be further discussed in the material to follow. One of the uses of the device is that of providing a magnetron-type of oscillator for developing high power in controlled fashion.

In another form of the invention the developed fluxes are utilized to provide a controllable field by the use of which, in combination with an expendible launching tube, a projectile may be ejected at high velocity.

The invention also has as one of its contemplated forms that of providing structure whereby a projected component can be caused to be ejected from the influence of the magnetic field at an extremely high velocity so that it may be made to function as a medium to track and even detonate missiles.

In a further form of the invention, as will be made apparent from what is to follow, the structure to be described will be found to be such as to be capable of functioning as a current amplifying device in such fashion that electromagnetic flux lines are concentrated and thereby energy derived from a mechanical or chemical source is so controllably directed as to provide a medium whereby fusion reactions may be triggered or initiated.

In still another form of the invention the structure herein set forth may be utilized to provide for the ejection of projectiles from a confined region at such velocities that even light-weight components may be capable of penetrating extremely heavy armor targets.

Various other forms of the invention will, of course, suggest themselves from what is herein to be further explained and set forth.

The invention has been illustrated in the accompanying drawings in several of its forms generally schematically to represent in principle the problems solved. By these drawings.

Figure 1:
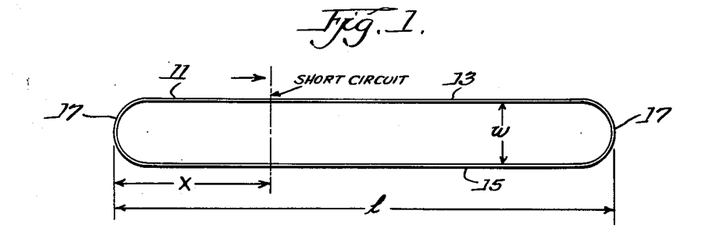
FIGURE 1 is a schematic representation to show generally the problem of flux concentration.

Referring to the drawings for a further understanding of the invention and making reference first to FIGURE 1, the element 11 may be considered as being generally in the nature of a copper tube of relatively short length which has been flattened to press it into two substantially parallel sheets, as shown by the upper and lower surfaces 13 and 15, respectively. Surfaces 13 and 15 are separated by a width distance, indicated as $w$, and extend for a length generally indicated as $l$ and round out at the ends, as indicated at 17. The dimensions $l$ and $w$ are not critical. In extreme cases dimensions $l$ and $w$ may be equal if the element is retained in tubular form but preferably the flattening is such that $l$ is greater than $w$. The ratio of $l/w$ is always unity or greater.

Considering this type of device, it will be recognized that if a current is permitted to flow in the walls of the cylinder and a short-circuit of the loop surfaces provided by loop compression, which is here represented by the dot-dash line, is assumed to advance from the left end of the loop toward its right end (as in the direction of the indicated arrow) with the velocity $$\frac{dx}{dt}$$

($x$ being the instantaneous distance of the short-circuit from the left end of the loop as it is shown and $t$ representing time for the short-circuit to move along the loop), the induced voltage across this short-circuit will be represented by $$E = wB\frac{dx}{dt}$$

where $w$ represents the width of the coil and $B$ represents the field strength of the magnetic flux induced.

This developed voltage is opposed by a voltage which is due to an increase in the flux in the remainder of the loop. If the edge- and end-effects of the loop, as well as the loop resistance, are neglected for simplification of consideration, then it is apparent that $$E = (l-x)w\frac{dB}{dt} = wB\frac{dx}{dt}$$

If this differential equation is solved to determine the flux density, it will be apparent that the field strength $$B = \frac{B_0}{1-\left(\frac{dx}{dt}\right)t}$$

This is to state that the field strength becomes inversely proportional to the amount of the loop which has not yet been shorted out by the movement of the short-circuit, as indicated. For convenience the short-circuiting is assumed above as being from one loop end toward the opposite end. However, in operation the short-circuit can be initiated at any point toward a loop end. The criterion is that the effect must always be that of shortening the loop as a result of such short-circuit. The time of collapse of the loop must be gauged to be sufficiently short that its inductive reactance exceeds its resistance. The loop conductors do not behave as substantially perfect conductors for longer time periods so that the loss of magnetic field lines through them with long periods of collapse would become excessive.

Figure 2:
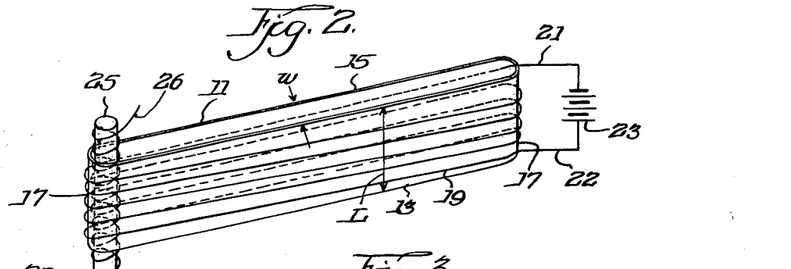
FIGURE 2 is a schematic representation of a single-stage amplifying device in accordance with the invention.

In carrying out certain of the aims and objectives of this invention the broad principle suggested in respect of the schematic representation of FIGURE 1 can be practiced in a simple form by a structure of the type shown in FIGURE 2. In this figure the primary coil forming the loop is also represented by the numeral 11. The primary coil 11 in FIGURE 2 is in the form of a section of a length D of an electrically conducting tubular element, such as a copper tube, having a wall thickness of the order of about 30–35 mils which has been flattened, as explained in connection with the reference to FIGURE 1, so that the top and bottom regions designated respectively 13 and 15 are separated from each other by a distance conventionally represented as $w$. The flattened cylinder is then wrapped with a wire field-coil 19 of relatively heavy wire of good electrical conductivity, such as a copper wire, of a considerable number of turns. A source of current is connected by conductors 21 and 22 to the field-coil. Any suitable current source conventionally represented solely for illustrative purposes as a battery 23 may be used.

A search coil, schematically represented at 25, is positioned internally of the flattened coil. The search coil consists of a selected number of turns of relatively fine electrically conducting wire wound upon an insulating rod, such as a Lucite rod. The ends 26 and 27 of the winding, which serve as the terminals of the secondary or search coil 25, may then be connected to any form of load circuit or indicating device desired for the purpose of registering or utilizing the effects produced.

In one form of operation of the coil device shown by FIGURE 2 it can be assumed that a rapidly acting collapsing force is applied to the loop 11 in a direction from the right to the left (looking at the drawing) so that a short-circuit of the coil occurs from right to left thereby to reduce the volume enclosing the flux resulting from energization of the field-coil winding 19.

Various ways and means to rapidly compress the primary coil and thereby to short-circuit it may be utilized. Any form of mechanical component, such as a rapidly moving press or roller which progressively changes the coil formation and short-circuits it in the manner explained, may be utilized. Also, as a component which occupies very little space and which possesses substantial energy to collapse the coil, recourse, for instance, may be had to an explosive charge which here is schematically represented at 31 in FIGURE 3. The primary winding 19 and its search coil 25, for illustrative purposes and in order to show the manner by which high current amplification can readily occur, is assumed to be rested upon a rigid base member 33. If an explosive charge is used to compress the coil, the base member should preferably be some component of substantial stability and illustratively might be a rock formation, although this could be a steel base formed sufficiently rigid to withstand substantial shock force.

Figure 3:
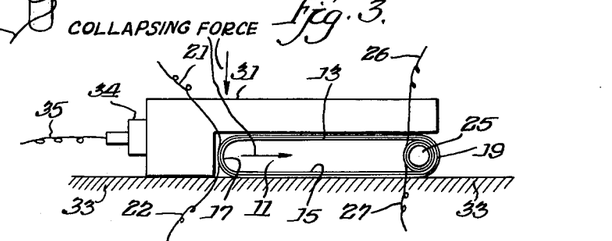
FIGURE 3 shows one suitable form of arrangement for collapsing a looped conductor of the type of FIGURE 2 and deriving energy therefrom.

The explosive charge, as shown at 31, is arranged to extend throughout the flattened length of the primary winding and slightly beyond, as shown to the left of the coil 19. In order to detonate or fire the explosive charge a suitable cap, conventionally represented at 34, is provided and through this a lead 35 applies the motivating force to initiate the explosion.

In the operation it can be assumed that the coil 19 is wound after the fashion described in connection with FIGURE 2 about the copper base member 11. It is energized by means of a battery or other suitable source, or, as will later be set forth, from a previous stage in the case of multi-stage operation.

If the end conductors 26 and 27 of the search coil 25 are connected illustratively to an integrating circuit (not shown) of suitable character for display upon an oscilloscope or other device, the instant of connecting current to the winding 19 of the field-coil produces an observable indication in the form of a pulse of registerable magnitude upon the oscilloscope by virtue of the energy supplied through the conductors 26 and 27 of the search coil. Any other known form of pulse-responsive device may be connected to be triggered from the resulting pulse.

If now this condition be registered and at this time the explosive charge shall come into being as a medium to apply a mechanical force to collapse the primary coil, it can be shown that the coil (looking at FIGURE 3) will collapse and short-circuit from its left-hand end toward its right-hand end as a result of the detonation of the explosive. Under these circumstances the flux which has been concentrated within the boundaries of the primary coil are confined to smaller and smaller volumes. By the time the explosive has been detonated in its entirety, thereby collapsing and short-circuiting the conducting base member 11, it can be shown that the voltage peak registered by the oscilloscope connected to the conductors 26 and 27 is proportional to $$\frac{V_1}{V_2}I$$

where $V_1$=volume of the field-coil which encloses the flux before collapsing;
$V_2$=volume of the field-coil which encloses the flux after it has been collapsed by the external force; and
$I$=the original current in the field-coil. It thus may be regarded as being directly proportional to the ratio of the original to reduced (and final) volume.

The collapsing of the primary coil accordingly establishes from the output resultant that the current and flux density within this flattened electrically conducting cylinder 11 increased by the above factor with the cylinder collapse.

In one particular experimental demonstration the initial field intensity in the loop with the connection of the source or battery 23 to the field-coil 19 and prior to any detonation of the explosive 31 was measured at 0.022 MKS units or 220 gauss. At the time the explosive charge was detonated the field intensity within the coil prior to the time the search coil was flattened and failed was measured as being 880 gauss which represented a compression of 4 to 1. For this condition it will be apparent that while the current increased by a factor of 4, the energy density in the magnetic field increased by a square fraction, or by 16 times. The increase in energy is supplied by the collapsing force applied to the coil.

In the foregoing example and by the illustration of FIGURE 3 it will be noted that applicants have suggested the rapid collapse of the electrically conducting base member 11 by the use of an explosive charge for such purpose. This is one form of energizing medium which has been found to be particularly useful. In any type of explosive detonation it is known that the explosive detonates from the point of initial activation through to the end of the explosive charge so that with the proposed arrangement of FIGURE 3 the electrically conducting base member 11 is rapidly compressed and short-circuited from its left-hand boundary through to the search coil at the right. In this sense a short-circuit is provided between generally parallelly positioned electrically conducting leads in such a way that the flux lines which pass therebetween are driven along ahead of the short and finally confined within a smaller volume. The search coil is positioned within this small volume and senses the intensity of the field in such volume. The electrically conducting base member 11, as above noted, is the collecting device for the energy which can be directed to any desired utilization point or system.

At times it is important to the operation that substantial increases in the field strength shall be obtained which exceed those obtainable from a single stage. Practical limitations usually are such that the desired ratio of the initial to the final volume cannot be obtained in a single-stage device. To meet such situations the standard stage which yields a determinable percentage increase in field is cascaded, almost indefinitely, to provide the desired operation. If, for instance, flat parallel leads, such as those depicted by the showing of FIGURE 3, are considered with an inductance connecting the plates following each sectional length of determinable distance, the arrangement is one capable of being extended indefinitely from a region where initial collapse and shorting of the inductance results. If resistance losses and edge effects with such a device are neglected or completely ignored in calculations, the operation can be resolved by conventional circuit theory. Even though in such a device determination of field intensity is generally a long and complex process, the calculations do lead to the end result that there is no change in the field intensity after the short and the observer advance a given distance (the selected separation between inductances) along the amplifier from any starting point regardless of the inductance.

To obtain an adequate magnetic flux for many types of utilization of the device, if the structure is such that flat parallel leads branch at the end of each selected measurable like distance from the point at which a shorting occurs, then, from the viewpoint of each other branch, each branch is a shunting inductance. The magnetic flux in each branch when the shorting has advanced from one loop or fork to another then will be found to be equal to the total initial flux.

Figure 5:
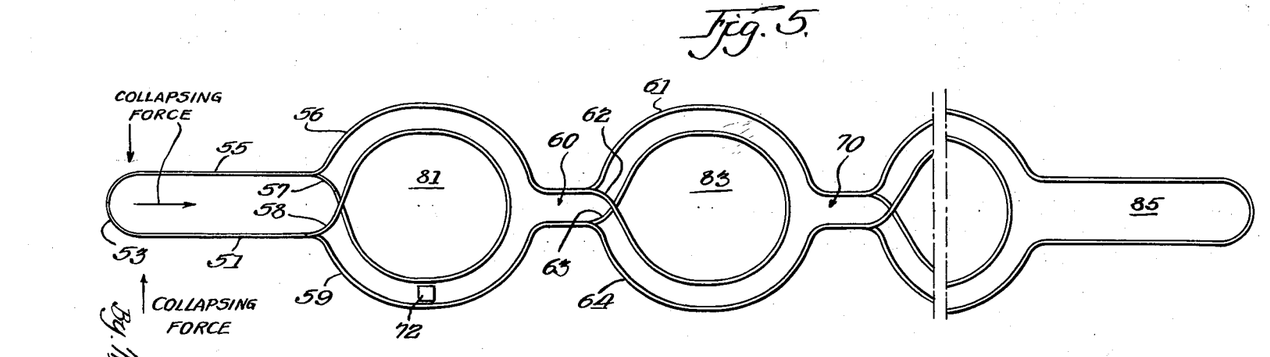
FIGURE 5 is a schematic representation of a multi-stage amplifying device using branching conductors for increasing the flux density.

Making reference to the device to be defined with respect to FIGURE 5, the several branches or loops which are formed comprise components twisted with respect to each other. The flux lines then combine in additive relationship when the branches or divided loops are rejoined. Neglecting various losses there is theoretically a doubling of flux for each stage. From this it will be apparent that if 20 ideal cascaded stages are utilized, the expected gain exceeds one million.

Figure 4:
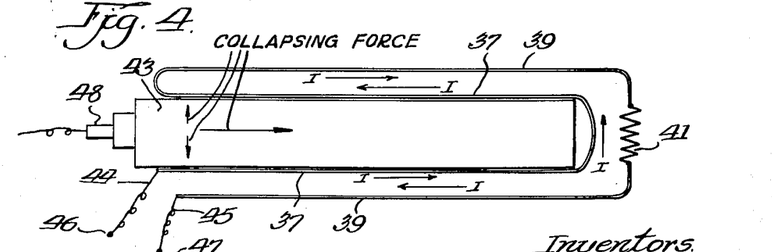
FIGURE 4 is a modification of a loop-collapsing arrangement.

Consequently, so considered, reference may now be made to the device schematically depicted by FIGURE 4 which represents a final power output stage capable of using the effects of substantial amplification and intensification achieved through a multiplicity of branching loops. In the arrangement of FIGURE 4 the input is assumed to have been the result of the generation of magnetic fluxes by a suitable number of stages, as hereinabove suggested and as will be later described insofar as the composite stages are concerned.

Reference to FIGURE 4 shows the input applied illustratively to looped electrically conducting plates 37 and 39 which connect through a suitable load 41, herein schematically represented by a resistor element, although it may be understood to be any load capable of using the electrical energy which is built up. The arrangement for deriving the mechanical power or energy to provide the shorting effect can be assumed to be an explosive detonating charge 43 positioned internally of the plates. The output energy from the multi-stage unit (as from that of FIGURE 5, for instance) is applied in any appropriate fashion, as by conductors 44 and 45 connecting terminal points 46 and 47 to the plate members 37 and 39. While for convenience the leads are not so shown, they are actually and preferably relatively wide flat sheets arranged to extend perpendicularly to the plane of the drawing paper.

If detonation of the explosive charge, here assumed as one form of the mechanical force, occurs, the energy of the high explosive is removed as it expands adiabatically from the detonating region 48 against the pressure of the field and the inertia of the plates which confine it. Under these circumstances, the available work from the high explosive is practically equal to the heat from the explosion and the heat left in the product gases dropping to room temperature as the pressure drops to one atmosphere. In such a generator the expansion ratio may be set so that, for instance, one-tenth of the heat of the explosion is left in the gas. Another loss, of course, would be due to the thickness of the skin in which the current is carried, but this loss, as will be appreciated, is very small in a massive final stage of the character shown by FIGURE 4 due to the fact that the lead spacing is greater than the skin depth, as could be expected.

The flux density must be chosen such that the electrically conducting plates 37 (which in one usable form may be copper, since it is relatively strong, rigid and inexpensive) driven out by the explosive charge represented at 43 have lost most of their kinetic energy as they reach the outer wall plates 39 which sets the required field intensity in this stage at something in the range of 100 MKS units or about 1 megagauss. Calculated on the basis of about one-tenth of the heat of explosion of the explosive left in the plate kinetic energy to insure that they reach the outer walls and connect solidly to them and computed with other losses, the overall efficiency of the stage can be calculated as being in excess of 50%.

Considering now the mechanism and device of a simple form for achieving the greatly increased input supplied to a structure of the character of FIGURE 4, for instance, reference may be made to FIGURE 5 showing a simplified form of multi-stage device. This multi-stage device is formed from an initial loop which is flattened and rounded at point 53 with 51 and 55 being the flattened sides. Side 55 divides itself into branches 56 and 57 on one side and side 51 forms branches 58 and 59 on the other side. The outer ends of branches 57 and 58 are twisted to form a closed loop, which, it will be observed, effectively twists or turns the relative positions of these conductors. Branches 56 and 59 are extended past the loop formed by the junctions of branches 57 and 58 and are paired again at 60. This arrangement allows the original flux lines contained between sides 55 and 51 to be twisted and pass through the paths formed by branches 56 and 58 and also branches 57 and 59 and to recombine at region 60 thereby effectively doubling the original flux.

In order to provide for the building up of the intensified magnetic field strength in the region 60, the loop is progressively and rapidly collapsed from left to right (looking at the drawing).

In one form of operation the loop may be rested upon a solid base and the upper surface rapidly collapsed against the lower surface. This may be done illustratively by any appropriate form of fast-acting mechanical or chemical collapsing force of the type already defined. One rapid form of collapsing media is found in an explosive charge which may be piled upon the unsupported surface of the loop so that a solid contact is maintained as stated. With detonation of the explosive charge and assuming the explosive to be detonated from its end 53 of the loop toward the branching region, the loop volume is reduced, as already explained, by driving side 55 against side 51 thereby to short it.

As the collapse continues it must be carried out in such a way as to collapse branch 56 against branch 58 and branch 57 against branch 59 until both branches are shorted and collapsed simultaneously toward region 60. The flux derivable and obtainable at region 60 is again divided by providing additional loops, as will more fully be explained. The current is established as being theoretically twice that obtainable at the region of the input. The current derived from the final stage is supplied to a suitable load.

With this condition having occurred the flux density is forced along the branch loops and the branch loops similarly compressed after having been held in an outwardly extending direction by appropriate material, the current derivable and obtainable, as indicated by the output from a search coil such as that explained in connection with the showing of FIGURE 3 at region 60 is again divided by providing additional loops, as will more fully be explained. The current is established as being theoretically twice that obtainable as an input to the first loop in the fashion explained. The current derived in the final stage is supplied to a suitable load.

At region 60 the branch 56 divides into two additional branches 61 and 62. Branch 59 is similarly divided at the same point into branches 63 and 64. As in the previous stage, branches 62 and 63 are combined and twisted to form a closed loop and branches 61 and 64 are extended past this loop and are paired at region 70. Additional stages formed by branching in this manner can be cascaded indefinitely.

Following the principles hereinabove outlined, it will become immediately apparent to those skilled in the art to which this invention is directed that at the confining regions, such as 60, 70, and the like, the device described may be formed into additional branches with resultant increased flux magnification. Illustratively, the device may use additional branch conductors to form three, four, five, or more pairs of conductors which function according to the principles above described with proportional increase in available output.

With this arrangement a search coil for current measurement was applied at point 72 in the first loop, and others in corresponding positions in the third and fourth loops. The maximum current observed in the first loop was 240 amperes, occurring 80 microseconds after detonation. The search coil in the third loop indicated a maximum current of 350 amperes and that in the fourth loop indicated a maximum current of 480 amperes, occurring 110 microseconds and 145 microseconds after detonation, respectively. This represented a gain factor of 2 in three stages or approximately 1.26 per stage at the stated times, it being understood that in such a determination zero time is that at which the detonation wave reached the probes imbedded in the explosive charges, and, considered for illustrative purposes with an initial loop 8 inches long, as being at a point 6 inches ahead of the first flux multiplier stage.

The described amplifier device so far set forth provides one significant portion of an over-all operating device to achieve many and varied results. The described device of FIGURE 5 when functioning with a final generator stage of the general type shown by FIGURE 4, for instance, may serve to provide the electron emission and magnetic controlling field required for the operation of a magnetron.

Figure 6:
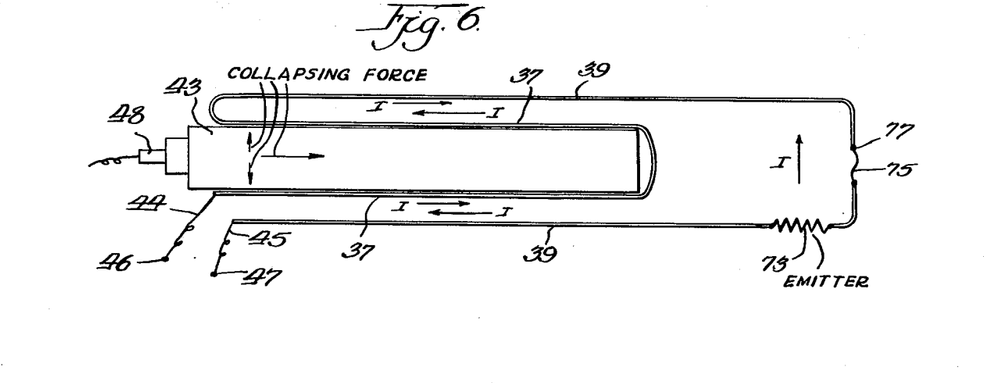
FIGURE 6 represents schematically a structure of the general type of FIGURE 4 and illustrates the application of the invention as an electron source and field-producing means for a device of the magnetron type.

Referring now to FIGURE 6, the general relationship to the showing of FIGURE 4 will be apparent. However, in the arrangement of FIGURE 6 the load 41 is replaced by an electron emitting substance conventionally represented at 73. This emitter, in the form of a cathode element, is constituted as a component which is adapted to emit electrons in copious fashion when suitably heated. The energy derived as a result of flux confinement into a smaller and smaller volume as the mechanical force applied against the sides of the loop progresses to short-circuit it produces the normal heating of a cathode element.

Many and various types of coatings may be applied to the heating element 73 in order that, with heating, electrons may be released therefrom. The coatings are preferably those of the type normally used with magnetrons and frequently are of the thoriated tungsten variety or combine barium and oxygen in known relationship and need not here be discussed in detail.

It will be noted that in the circuitry shown by FIGURE 6 the electron emitting element conventionally represented at 73 is serially connected with a fuse element 75. The fuse is formed of any type of metal such that it will promptly burn out when the current flowing through the section of the loop including the electron emitter reaches a pre-set value through this fuse at times when the loop volume is substantially reduced. The emitter, having acquired a state of high heat during the current build-up, will, of course, continue to emit electrons even after the burning out of the fuse. At this point in the operation it will be observed that there is an open circuit connection between point 77 and the emitter 73, but because of the electron emission the current flow continues to be supported by reason of the fact that electrons are accelerated from the emitting surface 73 to the point 77, functioning as an anode because of the high electrical field between the two points.

The electric field tends to cause electrons to fall from the cathode to the anode. The strong magnetic field compels the electrons to revolve around the field lines.

The electrons can reach the anode only after radiating away the energy acquired from the electric field.

A magnetron type of device operated in accordance with the teachings of this disclosure provides increased operating efficiency due to the fact that it is adapted to be operated at substantially higher voltage and, because of the confinement of the magnetic flux developed within the loop to an extremely small volume with loop collapse, it operates at a very substantially greater field intensity than the same type of device controlled by practices heretofore in effect.

The device as described will generate a pulse of electromagnetic radiation distributed through the entire microwave spectrum. The electric power output of the device may also be connected to a magnetron of more conventional design, to generate microwave energy confined to a narrow frequency band.

The invention will be understood to be applicable with many and various specific forms of magnetron control devices. The particular type of magnetron component may vary widely but illustratively the invention herein disclosed may be considered as providing by the heating electron emitter 73 of FIGURE 6 an emitter structure adapted to emit electrons to be accelerated in the direction of an anode element which, with the opening of the connection provided by the fuse 75, will be constituted by the anode 77. For this condition of operation the electron flow is between the electron emitter 73 and the anode 77. The magnetic lines of force which are available in the loop structure are then applied in well-known path direction so that the external magnetic field interacts with the magnetic field set up by the electron so that the moment an electron leaves the emitting surface 73 to move toward the anode 77 it will find itself being acted upon by the added magnetic field. The force arising from this interaction is at right angles to both the magnetic field and the line of motion of the electron. This causes the electron to move in a more or less curved path.

The general relationship of the positioning of the emitter with respect to the anode and the general relationship of the path followed by the electron, depending upon whether or not the electron field is weak, whether it is at a critical value, or whether it is stronger than a critical value, or even where no magnetic field has been applied, is well-known and illustratively is described in the text entitled "Introduction to UHF Circuits and Components" by Milton S. Kiver, published by D. Van Nostrand Company, New York, 1955, and particularly to the portion encompassed between pages 163 and 185 thereof. Further illustration is thus believed to be unnecessary at this point.

The output from such a magnetron device, which represents usable pulsed energy, may be made available for any desired purpose and further discussion thereof is believed to be unnecessary.

If reference is again made to the multi-stage structure shown by FIGURE 5 and to the example of use thereof, it can be appreciated that the fields developed within the regions formed internally of the loops provided by the branched conductors 57 and 58, for instance, or 62 and 63, for instance, have not been described as being utilized in the development of the current increases derived for supplying loads such as the load 41 in FIGURE 4 or the electron emitter 73 in FIGURE 6. The fields developed centrally within these looped areas, which may be identified as areas 81, 83, etc., it will be seen, are effective in the same direction. Illustratively, the electromagnetic flux lines developed within the loops formed by conductors 57 and 58, as well as 62 and 63, and thus available in the regions 81 and 83 may be considered as extending in a direction into the plane of the paper on which the drawing is made. If additional stages of a multi-stage arrangement are considered, the same conditions occur.

This effect may be utilized by folding and twisting, as it were, the different loops with respect to their longitudinal axis so that each loop is turned 180° with respect to its neighbor so that, illustratively, a tubular element may be passed through the loops if the conductors are arranged and folded back and forth in more or less accordion fashion so that the regions at which the conductors branch to form the separate loop areas appear at diametrically opposite although longitudinally spaced points on the tubular element which is assumed to be passed interiorly of the loops 81, 83, etc.

Under these circumstances, if now it can be assumed that a collapsing force is applied either mechanically or chemically in such a way as to collapse the structure in the fashion already explained, it will be observed that the developed fields within the regions 81, 83, etc., are progressively and sequentially produced and that by the back and forth or accordian type of folding of the structure the fields always are directed in the same direction as far as the interior of the tube about which the loops are passed is concerned. Consequently, along the length of the tube strong fields are progressively and sequentially developed. The developed fields can be utilized to control the movement of a body contained within the tubular member.

These magnetic fields develop with the collapse of the loop structure in a way such that the lines of flux have regions which extend parallel to the tube axis and which then barrel outwardly toward the tube periphery. By controlling the collapse of the structure a body positioned within the tube can be caused to move immediately ahead of the produced flux lines to be projected through the tube at a rate corresponding to that at which the structure is collapsed and the projected body can then be forced outward from the tube at high velocity.

With a structure of the type last described it will be apparent that the mechanical collapsing force may be applied inwardly about the structure, for instance, by wrapping it about the outside of a tubular element about which the conducting paths have been wrapped. So provided, detonation of the explosive charge or application of any other magnetic force tending to collapse the loop structure provides a tubular member in which a strong magnetic field is developed, with the field advancing with the progress of detonation and in like direction. The velocity at which the moving field within the tubular element is created may readily be adjusted to any high value corresponding, for instance, to the detonation velocity of common fast explosives. Explosives are known which have a detonation velocity of 8.2 km./sec. and higher. These may be used to cause the field to move at equal rapidity. Where a body which is a good electrical conductor is contained within the tubular body, it will become apparent that such body can be caused, with loop compression, to ride on the magnetic field, as it were, and move through the tubular element at the velocity at which the collapse occurs.

Various materials for forming such a component are known but illustratively beryllium is particularly suitable because of its low density and high heat capacity. Despite the fact that substantial heat energy is developed, the beryllium internal component nonetheless moves through the tubular element at a rate corresponding to the changing magnetic field and will leave the tubular element with a velocity corresponding thereto. Under the circumstances, if the loop is rapidly collapsed, such as by the detonation of the explosion, to cause the magnetic field to travel down the tube at the rate of loop collapse, the component is readily accelerated to the velocity of the field and maintains at all times the same relative position within the field through the point of discharge.

Any eddy currents in the component within the tubular member progressively flow toward its center, as might be expected.

From the foregoing considerations, when a block of beryllium is placed within a magnetic field, eddy currents are generated on the surface of the block. These eventually dissipate energy in the metal which is equal to the specific energy of the field. The field which can be applied to beryllium without melting any of the metal has an energy content of about 1,000 calories per cubic centimeter. The corresponding field can be shown to be about 70 MKS units and to be capable of exerting a pressure of about 42,000 atmospheres on any conductor suddenly placed in it. Normally one would not expect in practice to use such pressures, but even under these conditions it has been established that melting of the beryllium sabot will not be a problem even under such circumstances.

The type of launcher thus described is accordingly adaptable more readily to larger models than most high velocity guns, but it is in no respect limited thereto. If, for instance, a gun considered to be 4" in diameter were to be used to drive a beryllium sabot 4" in diameter and also 4" long, if the field pressure used were 10,000 atmospheres, it can be shown that the launch tube would have to be about 16 feet long to attain a full launching velocity of about 7.5 km./sec. It will be recognized specifically in telemetering equipment, that the low accelerating force and the larger model size has many advantages For such a launcher the tubular member about which the branched conductor is wrapped, as above explained in connection with the accordian-type folding of the multi-stage unit of FIGURE 5, and about which the collapsing force in the nature of an explosive charge is also placed, can be of any type of expendible material which is readily available with smooth and accurate finishings. These smoothly finished tubes make it possible to provide an extremely accurate aiming and such materials may be in the form of a glass or a glass-fiber type of tubular element about which the conductors are wrapped and within which the sabot is positioned. The important factor is that the tubular member shall be an insulator and consequently materials of this form, other than glass, may be used if desired. Indeed, it is to be noted that while the detonation of the explosive charge, to cause the magnetic field to move and travel within the tubular element in the fashion above explained, will break or demolish the launching tube behind the model or sabot, the tube collapses in such a way that no extremely high velocity fragments are produced and the sabot equally out-distances the gas and fragments which are emitted to the vacuum system behind it.

It will be apparent from what has been stated that with the advent of supersonic airplanes the need for devices to eject projectiles at extremely high muzzle velocities becomes greater and greater. This is, at least in part, because a higher velocity projectile delivers more energy to a target. The delivered energy is proportional to the square of the velocity so that the higher the velocity the greater the released kinetic energy. Further than this, in firing at a moving target the lead time is less the higher the velocity at which the projectile is ejected. Consequently, with higher and higher velocities of space interceptors, the utility of a high velocity ejection becomes more and more apparent.

Following the principles stated, the amplitude and shape of the precise magnetic field developed is determined by the geometric shape of the projected device, as well as the detonation velocity of the explosive charge assumed to collapse the branched conductors wrapped about the tubular element. Under such circumstances, the magnetic field is developed in such a way that the flux lines interiorly of the tube approach an axial path, although they do barrel toward their ends to a certain extent. If the projectile is placed within the tubular element and as close as possible to the region where the lines of magnetic flux extend substantially axially, it will be apparent, when the arrangement of FIGURE 5 is used and the various sections of the multi-stage unit are twisted and folded in accordian fashion, as above explained, so that the tubular element in which the projectile is to be held so as to extend through the different regions 81, 83, etc., in such fashion that the flux lines are always in the same direction, that the detonation of the explosion causes the developed field and the electromagnetic flux lines of the described shape to travel down the tube formed by a sequence of regions 81, 83 and so on.

The interaction of this field and the skin of the projectile then sets up eddy currents near the surface of the projectile. These eddy currents then react with the field and the projectile is accelerated down the length of the element (here assumed to correspond to the barrel of the launching medium) and maintains the same relative position with respect to the projectile at all times until the projectile is ejected from the tubular element or barrel.

Under the foregoing circumstances, the velocity which the projectile attains will correspond to the detonation velocity of the explosive. For some conditions and when certain geometrical considerations are taken into account, the velocity may be even higher than the detonation velocity. For certain explosives now available and known this velocity can be as much as 30,000 feet per second.

The eddy currents which are generated on the surface of the projectile progressively flow toward the center of the projectile and also generate heat which can cause the projectile to melt. This tends to become a problem with the particular size projectile that is assumed, but where the projectile is formed of beryllium, for instance, the heating is not unduly serious. It is a known fact that the resistivity of pure beryllium is about 40% of standard copper or about $4.3 \times 10^{-8}$ MKS units. The mean depth of the skin current in a magnetic field switched on at time zero is about $$\delta = \sqrt{\frac{2\rho}{\mu} t}$$

$$= \sqrt{\frac{2(4.3 \times 10^{-8})t}{4\pi \times 10^{-9}}}$$

$$= \sqrt{0.0685 t}$$

where:

$\delta$ = skin depth;
$\rho$ = resistivity; and
$\mu$ = magnetic susceptibility.

From this it follows that, for instance, where a projectile is ½" radius (1" diameter) and it is to be accelerated to 30,000 feet per second in 12", its time of acceleration is approximately 60 microseconds. From this it can be seen that the skin depth through which the eddy currents flow will be about 0.125". Even though, with projection, a layer of this thicknes might exhibit melting properties, this nonetheless is not a serious situation.

In most systems of the type described, the projectile itself is encased in a beryllium sleeve used to drive it outwardly from the tubular member. This component is not shown since the projectile is of known form and merely has the beryllium encasement. The extremely high muzzle velocity of this device is extremely valuable for space operations since no atmospheric drag tends to slow the projectile and cause it to burn up. Lower velocity models may be adapted for use in the atmosphere.

Further, from what has been above stated, the amplification of electromagnetic fields and the concentration of the energy derived from a large mass of explosive material confined into a very small volume by taking recourse to the described structure makes possible a unit where, by concentrating the energy from the explosive force into an extremely small volume of deuterium and tritium, it is possible to initiate a fusion reaction.

In this respect small bombs without radioactive fission products may be utilized either for military purposes or, illustratively, for excavation purposes where large amounts of earth must be moved rapidly. For instance, if the energy from a device of the multi-stage character disclosed in FIGURE 5 and carried, illustratively, to a substantial number of repeating stages (FIGURE 5 being a multi-stage device herein assumed to be one of $n$ stages) is considered and it is assumed the developed energy is instantaneously forced into a volume occupied by a sphere one centimeter in radius, and that within the sphere there is a mixture made up of an equal number of deuterium and tritium atoms, it is apparent that if the explosive is to be large enough so that the expense of the tritium is significant, one would expect to use a small deuterium-tritium booster surrounded by a larger deuterium charge.

It is known in the art that the curve for power generated by a deuterium-tritium reaction plotted as a function of temperature has a knee at 100 million degrees, so that this temperature will be assumed for the reaction. The power generated under these conditions may be considered to be 100 watts/cm.$^3$ for a density of $10^{15}$ nucleons/cm.$^3$. The rate of reaction is always proportional to the square of the number of nucleons, and since the density is known to be $4 \times 10^{22}$ atoms/cm.$^3$, the power generated will be $1.6 \times 10^{17}$ watts/cm.$^3$ under conditions stated.

If the energy balance of the reacting sphere of deuterium and tritium with a radius of one centimeter is assumed, the loss of radiation becomes only about 1% of the total kinetic energy of the charged particles which, for calculatable reasons, may be ignored. In the text "Physics of Iionized Gases" by Lyman Spitzer (Interscience, 1956), at page 87, the conductivity of hydrogen at $10^8$ degrees is given at $2.5 \times 10^7$ watts/degree-cm. Heat conductivity is known to depend upon the 5/2 power of the temperature and consequently a substantially isothermal region surrounded by a thin zone in which the temperature drops rather rapidly is known to exist. The zone of steep temperature gradient moves outward rapidly as more hydrogen is heated by conduction.

For the foregoing it is apparent that a reasonable assumption for temperature drop in one millimeter may be considered as $5 \times 10^7$ degrees. From this it follows that the conduction heat flux is $12 \times 10^{14}$ watts/cm.$^2$, and thus about $1.5 \times 10^{16}$ watts total. The generated energy is $1.6 \times 10^{17}$ watts/cm.$^3$ or $7 \times 10^{17}$ watts total, so that the generated power exceeds any conduction losses. Consequently, increasing the size improves the ratio of generation to losses, since the generation is volume-dependent and the loss is surface-area-dependent.

Expansion of the sphere assumed under its internal pressure of $10^9$ atmospheres is about one millimeter in a millimicrosecond, and although this is significant it is in no respect a serious effect. Approximately one millimicrosecond is required for the reacting region to double in size since the energy required to heat one cubic centimeter of liquid hydrogen to a temperature of $10^8$ degrees is $1.2 \times 10^8$ joules and the power generated is $1.6 \times 10^{17}$ watts/cm.$^3$. This factor indicates that the reaction front moves faster than the pressure shock front.

It might be remarked at this point that the calculations above suggested assume that neutrons carrying 4/5 of the energy released in the action escape completely from the hot region. If, for instance, the device is used to detonate a large mass of surrounding hydrogen, then, as the hot region expands due to heat reduction to the surrounding cold hydrogen, it will soon reach a radius in which most of the neutrons will collide before reaching it and so leave their energy inside. The collision cross-section of fast neutrons and hydrogen is about 0.6 barn, so that the above radius is about 40 centimeters.

To carry the analysis further, a thermonuclear reaction will be sustained in liquid hydrogen if a sphere of deuterium and tritium one centimeter in radius attains a temperature of $10^8$ degrees. The energy required to heat a sphere of hydrogen to such temperature is $5.3 \times 10^8$ joules. If now, for instance, TNT be considered as the explosive, it is known that there are $7 \times 10^8$ joules in 100 pounds of TNT. Under such circumstances it will be apparent that several multi-stage units of the character set forth and described in FIGURE 5 may be arranged in parallel so as to combine the energy output into an arc simultaneously in one form of detonation.

Another method would be to accelerate a plasmoid having approximately the density of liquid hydrogen into the deuterium-tritium mixture. For this condition the temperature would have to be high enough to make it a good conductor, namely, 10,000° K., at which the gas pressure would then be approximately 40,000 atmospheres which would have to be contained by the magnetic field. Indeed, this field would be high by normally considered standards, but it should be borne in mind that all fields in an explosive-actuated device must be of this general order so as to match the 250,000 atmosphere detonation pressure of the explosive. A plasmoid of such character may be generated by the device described in connection with the showing of FIGURE 5 and accelerated in a so-called rail-electric gun, which will be recognized as the type frequently described previously by the Germans as a weapon of warfare.

As a last form of use of the invention herein set forth and heretofore described, if the projectile is constructed so that the length thereof is substantially greater than its diameter and thus the projectile assumes a quasi-rod type formation, it will penetrate a target more readily than would a sphere when the impact velocity exceeds about 8,000 feet per second, assuming, of course, that the rod strikes the target on its end. Various investigations by workers in the field who have shot aluminum spheres at small finishing nails and sewing needles have reported this effect. Illustrative of such conditions which have been reported, investigators at the Massachusetts Institute of Technology have reported that aluminum spheres struck on the end of nails at a velocity of 8,300 feet per second were drilled through by the nail upon impact.

Following through from this analysis, it will now be apparent that a 1" diameter steel rod of a length of one foot striking a target at a velocity of about 10,000 feet per second should penetrate a very thick piece of steel. Considering the accelerating force applied to the projectile hereinabove described in connection with the twisted and accordion-folded branch conductors of FIGURE 5, such a component is readily usable as a pay load of a bazooka type rocket effective as an armor piercer.

In the foregoing description and particularly in connection with the described launcher, reference has been made to the fact that the sabot may be a beryllium element. This has been found to be one of the more desirable elements for such use, but it may be pointed out that the invention is in no respect restricted to beryllium. Other low density metallic conductors may be used, as will be apparent, and illustrative of other materials are components made of aluminum or magnesium. Further than this, the sabot may be formed of electrically nonconducting material with a coating of beryllium or other material as above mentioned. It is therefore to be understood that invention described is in no respect limited to the specific component disclosed.

Various other applications of the invention will, of course, become apparent to those skilled in the art to which the description is directed and therefore it is not intended that this disclosure shall be limited except insofar as becomes necessary by limitations set forth in the claims such as those to follow.

Having now described the invention, what is claimed is:

1. An amplifying device comprising a looped conducting path and means adapted for establishing a flow of current in the path thereby to produce an electromagnetic flux, means for progressively shortening the loop by collapsing thereby to concentrate the total flux into a substantially reduced volume, and means to direct the energy in a controllable manner.

2. An amplifying device comprising a looped conducting path and means adapted for establishing a flow of current in the loop path thereby to produce an electromagnetic flux, means for progressively shortening the loop thereby to concentrate the developed flux into a reduced volume progressively decreasing with collapse, and means to utilize the energy concentration resulting from loop collapse.

3. An electrical amplifying device comprising means for establishing within an electrically conducting body a perimetrically bounded electromagnetic field, longitudinally applicable means for collapsing the field confining means to cause the flux lines to move toward a region of maximum concentration in a minimal volume, and means for directing energy produced by collapse of the field confining means to a utilization point.

4. An amplifying device comprising a looped conducting path and means adapted for establishing a flow of current in the path thereby to produce an electromagnetic flux, means for progressively shortening the loop by mechanically collapsing at a rate of collapse such that the inductive loop reactance exceeds the resistance and the total flux is concentrated within a substantially reduced volume, and means to direct the resultant energy in a controllable manner.

5. An electrical amplifying device comprising means for establishing a perimetrically bounded electromagnetic field, longitudinally applicable means for suddenly and violently collapsing the field confinig means, and means for directing energy produced by collapse of the field confining means to a utilization point.

6. An amplifying device comprising a looped conducting path and means adapted for establishing a flow of current in the loop path thereby to produce an electromagnetic flux, means for progressively shortening the loop by collapse thereby to progressively move the flux into a substantially reduced volume, and means to direct energy concentration resulting from loop collapse to a utilization point.

7. An amplifying device comprising a looped path adapted to conduct electrical current to produce an electromagnetic flux density within the loop, means for progressively shortening the loop by a collapse thereof from an initial collapse region to a small closure volume thereby to confine the total developed flux within a substantially reduced volume, and collector means to direct the concentrated and intensified energy due to flux concentration to a load in a controllable manner.

8. An amplifying device comprising a looped conducting path, means to establish a flow of electrical current in the path to produce a flux density of predetermined intensity in the loop, means for dividing and twisting the loop at one end into $n$ individual paths each also forming a loop, means to recombine said $n$ paths and terminate the same at a region where the flux paths are in adding relationship to produce $n$ flux lines for each original flux line without regard to volume, means to apply an advancing mechanical pressure along the loop to produce a moving force sufficient to collapse the looped path in the direction of force movement thereby to concentrate the developed field in the direction of the divided and recombined paths, and means to direct the concentrated and intensified energy from within the recombined paths to a utilization point.

9. A generating device comprising a looped current conducting path and means to induce a current therein to produce magnetic flux lines, means for terminating the looped path at one end in $n$ separate twisted paths, means combining the $n$ separate paths in a combining region, means for initiating a rapidly acting and progressive loop-collapsing force to cause the loop to short and reduce the volume to a minimal value for moving the magnetic flux concentration progressively in the direction of the advancing short-circuit along the loop path toward the divided paths and toward the combining region to produce a concentration in the flux lines in the loop volume immediately ahead of the short-circuit, and collector means in the combining region to convey the energy derived from the flux lines to a utilization region.

10. An amplifying device comprising an electrically conducting loop terminating in a plurality of divided loop structures, each of the divided loop structures terminating in similar additional divided loop structures, means for supplying an electrical current flow within the first loop structure thereby to produce electromagnetic flux lines perimetrically bounded by the loop structure, means to collapse the several loop structures progressively longitudinally toward the direction of division thereby to concentrate the developed electromagnetic flux lines within a substantially reduced volume with progressive loop collapse, and means located at the region of loop termination for directing the concentration of energy resulting from loop collapse to a utilization point.

11. The structure claimed in claim 10 comprising, in addition, a serially connected fuse and an electron emitter included in the terminating loop structure, said emitter being adapted to heat with concentration of electromagnetic flux lines in the terminating loop so that electrons are emitted from the heated emitter, and said fuse being adapted to break with said heating so that emitted electrons from the emitter are directed to the loop-side connecting point of the fuse with the voltage developed within the terminating loop being sufficient to accelerate the emitted electrons toward the fuse terminal on the loop as an anode, the electron path being substantially normal to the path of the electromagnetic flux lines in the terminating loop with loop collapse.

12. The structure claimed in claim 10 comprising, in addition, means for twisting one of each divided loop conductor at each point of division and connecting one of each divided conductor of the loop to form an additional closed loop path, means for twisting the divided conductors and the closed loop paths and refolding the same in accordian-like fashion to provide a progressive series of concentrically located and progressively longitudinally spaced closed-loop paths formed from the divided loop conductors so that, with progressive loop collapse, the electromagnetic flux lines through each closed loop path is in the same direction thereby to make a conducting body axially of the closed loops in a direction away from the region of initial loop collapse.

13. An amplifying device comprising a looped conducting path of appoximately elliptical shape having a cross-sectional relationship between length and height greater than unity and having an electrical path width which is greater than the separation of the conductors, means for establishing an electric current flow within the path to produce a flux density within the loop of known intensity, means for dividing and twisting the loop at the end to provide a plurality of individual divided paths, each path also forming a loop, means for redividing the divided paths to form a plurality of additional divided paths, each divided path also forming a loop, a terminating loop-section for supplying the loop output energy to a load, the load comprising a serially connected electron emitter for emitting electrons upon heating and a fuse means adapted, with heating to a predetermined degree, to physically separate the emitter from the terminating loop-section, and means for progressively and rapidly collapsing the loop along its longitudinal axis from one end to the other, the said collapsing means being adapted progressively to collapse the loop and its divided loops in the direction of the terminating region including the load thereby to concentrate the flux energy in the terminating loop within a substantially reduced volume and to heat the emitter, the heated emitter and the terminal point for connecting the fuse constituting respectively an anode and a cathode of a pulse generating means adapted to be activated with loop collapse.

14. The method of providing current amplification which comprises initiating a current flow in a looped conducting path thereby to produce an electromagnetic flux density proportional to the current, progressively shortening the loop from one end toward the other to concentrate the total flux in a substantially reduced volume, and directing the concentrated and intensified resultant energy in a controllable manner to a utilization point.

15. The method of providing current amplification which comprises initiating a current flow in a looped conducting path thereby to produce an electromagnetic flux density proportional to the current, progressively shortening the loop to concentrate the total flux in a substantially reduced volume, and directing the concentrated and intensified resultant energy in a controllable manner to a utilization point.

16. The method of concentrating magnetic flux lines in current amplification which comprises initiating a current flow in a looped conducting path thereby to produce within the path an electromagnetic flux, progressively short-circuiting the loop from one end toward the other to advance the flux lines ahead of the short-circuit to concentrate the total flux in a substantially reduced volume, and deriving a high energy output in a controlled manner at the region of concentration.

17. The method of concentrating magnetic flux lines in current amplification which comprises initiating a current flow in a looped conducting path thereby to produce within the path an electromagnetic flux, progressively short-circuiting the loop to advance the flux lines ahead of the short-circuit to concentrate the total flux in a substantially reduced volume, and deriving a high energy output in a controlled manner at the region of concentration.

18. The method of current amplification which comprises the steps of producing a flow of electrical current within a looped path to produce a flux density of determinable intensity within the loop, terminating the loop at one end in a plurality of additional loops twisted with respect to the original loop for continuing the loop into $n$ individual looped paths, recombining the $n$ individual paths in a region where the flux paths are in adding relationship thereby to produce $n$ flux lines for each original flux line without regard to volume, applying a loop-collapsing force to the initial looped path sufficient to establish a short-circuit and thereby effectively reduce the region within which the developed flux paths are concentrated, advancing the loop-collapsing force in the direction of the divided looped paths and forward the recombining region thereby to short-circuit the loop progressively from one end to the other to concentrate all useful developed flux in the region where the $n$ paths are combined, and collecting the electrical energy derived from the flux compression and concentration to supply a utilization point.

19. An energy converter comprising a closed conducting loop path having means to establish a flow of electrical current therein, means to derive output electrical energy from the loop determined by the flux density produced therein with current flow, and mechanical means to collapse the loop to reduce the current path therein and thereby to convert the collapsing energy of the mechanical means into electrical current in the loop.

20. An energy converter comprising a closed conducting loop path having means to establish a flow of electrical current therein, means to derive output electrical energy from the loop determined by the flux density in a selected region thereof, and mechanical means to collapse the loop to reduce the current path therein to one occupying only the selected area and thereby to convert the loop-collapsing energy of the mechanical means into electrical current in the loop.

21. A device for converting energy from one to another form which comprises an electrically conductive closed loop path, means to establish a flow of current in the loop path, means at a selected region of the loop path to derive output electrical energy from the loop determined by the magnitude of the instantaneous current flow and flux density therein, and mechanical means to collapse the loop progressively to reduce its volume and current path length toward the region whereat output electrical energy is derived thereby to convert the collapsing force of the mechanical means into electrical current output from the loop.

22. A device for converting energy from one to another form which comprises an electrically conductive closed loop path, means to establish a flow of current in the loop path, means at a selected region of the loop path to derive output electrical energy from the loop determined by the magnitude of the instantaneous current flow and flux density therein, and means to support an explosive charge to collapse the loop in a longitudinal and progressive fashion with charge detonation to reduce the loop volume and current path length toward the region whereat output electrical energy is derived thereby to convert the collapsing force of the mechanical means into electrical current output from the loop.

23. An energy converting device comprising a closed electrically conducting loop path, means to supply electrical energy to the entire loop path, transducer means to collect output energy from the loop, and means for supporting an explosive charge adapted to be detonated adjacent to the closed loop path, the detonation of said charge causing a progressive and substantially instantaneous loop collapse and short-circuiting to reduce the loop volume in the direction of the output collecting means thereby to concentrate the magnetic flux energy developed by current circulating within the loop substantially completely at the region whereat the output is derived and to convert thereby the force of the mechanical detonation into electrical energy.

24. An energy converting device comprising a closed electrically conducting loop path, means to supply an electrical current to the entire loop path to produce a flux density wtihin the loop proportioned to the flowing current, means at a collecting region of the loop to transmit the loop current to an external utilization means, and means for supporting an explosive charge adapted to be detonated adjacent to and surrounding the closed loop path, the detonation of said charge causing a progressive and substantially instantaneous mechanical collapse and short-circuiting of the loop path to reduce the loop volume in the direction of the output collecting means thereby to concentrate the magnetic flux energy developed by current circulating within the loop substantially completely at the region whereat the output is derived and to convert thereby the force of the mechanical detonation into electrical energy.

References Cited in the file of this patent

UNITED STATES PATENTS

| | | |
|---|---|---|
| 2,692,976 | Tomcik | Oct. 26, 1954 |
| 2,803,804 | Kihn | Aug. 20, 1957 |